Figure 1:
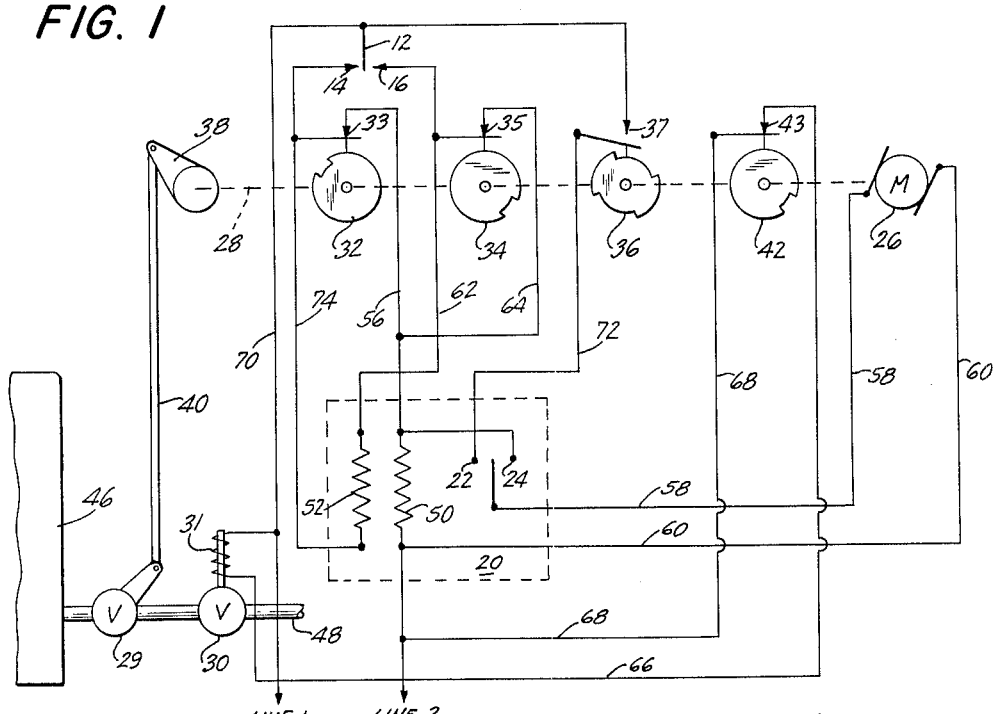

INVENTOR.
LOUIS J. NEWMAN
BY James and Franklin
ATTORNEYS

United States Patent Office 3,228,604
Patented Jan. 11, 1966

3,228,604
CONTROL MECHANISM WITH INTERMEDIATE CORRECTION STATE AND WITH TIME DELAY FOR STABILIZATION
Louis J. Newman, 9 Westwood Ave., New Rochelle, N.Y.
Filed Oct. 23, 1962, Ser. No. 232,517
11 Claims. (Cl. 236—78)

This invention relates to control mechanism, and more particularly to control mechanism for automatic regulation of temperature, pressure, fluid flow, or other such condition which is measurable by a suitable sensor.

One common example of temperature regulation is the control of room temperature, either by heating or cooling (air conditioning), or both. It is common to employ a thermostat with spaced contacts as the sensor, and there is a spread or lag of at least several degrees temperature in the movement between the contacts. Thus, if heat is provided by the closing of sensor contacts on one side, and after a time the thermostat opens, the flow of heat continues until the opposite contact is closed. This fact, taken together with the high inertia of the heating system, causes the heating of the room to continue too long. To help overcome the resulting exaggerated swings in temperature, it has already been suggested that an intermediate state of the heat supply (or other correction, depending on the condition being regulated) may be provided. If desired, several intermediate states may be provided corresponding to say one-third and two-thirds of full operation.

The thermostat functions as before, but in mild weather the system may operate largely between the "off" and intermediate states, and in cold weather it may operate largely between the intermediate and the "on" states. The corrective control may be a position control, for example, a damper for a coal furnace, a control valve for a gas furnace, or a fan speed rheostat for a circulating fan, or the corrective control may be a time control, say for an oil burner in which the extreme states may be "on" and "off," and the intermediate state may be cycled for a period of say five minutes on and five minutes off. (With two intermediate states, one state may operate the burner for say five minutes on and ten minutes off, and the other state may operate the burner for say ten minutes on and five minutes off.)

Such multi-operational systems are an improvement over a simple "on" and "off" system, but they still have defects. The thermostat contacts may flutter or open and close several times momentarily, thereby putting the control mechanism unnecessarily through one or more complete cycles. Someone walking across the room, or the passage of a truck on the street, at a time when the contacts of the sensor are just about to close or to open, may cause flutter and false indication at the thermostat.

This difficulty may be overcome by the introduction of a time delay in combination with the multiple control to insure stabilized operation. The time delay is most simply and inexpensively provided by the use of a thermal relay. In accordance with a further feature and object of the invention, a ballast resistor is employed as a relay holding circuit with the thermostat in closed position, and is also used to reduce the heating current in the relay during the holding period. In preferred form, the heat of the ballast resistor may be added to that of the heater resistor in the relay for greater efficiency in the use of electrical current.

Figure 2:
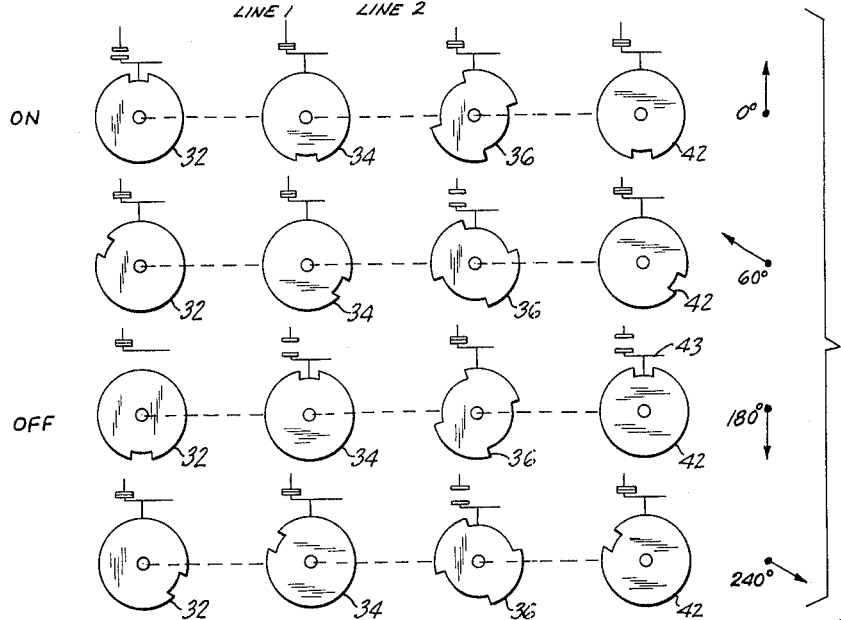
Figure 3:
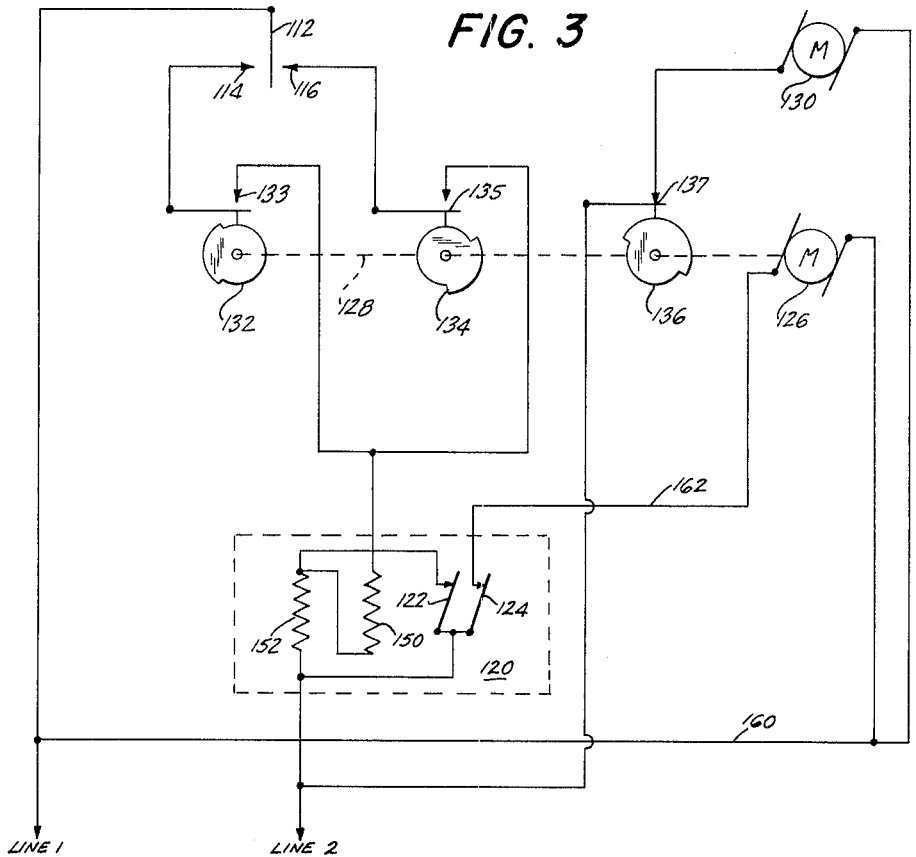
Figure 5:
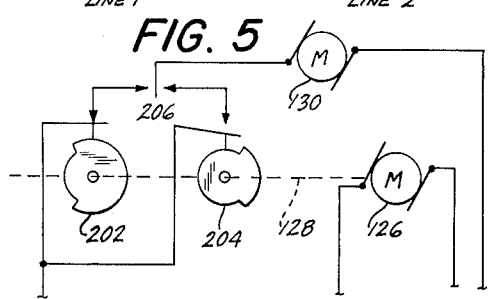
Figure 4:
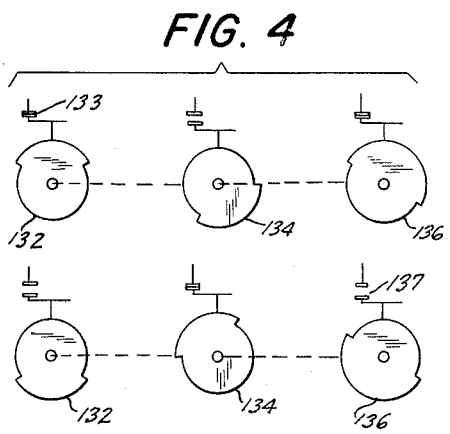

To accomplish the foregoing general objects, and other more specific objects which will hereinafter appear, my invention resides in the control mechanism and the elements thereof and their relation one to another, as are hereinafter more particularly described in the following specification. The specification is accompanied by drawings in which:

FIG. 1 is a schematic diagram showing the invention applied to a gas heated furnace;
FIG. 2 is explanatory of the operation;
FIG. 3 shows the invention applied to an oil burner;
FIG. 4 is explanatory of the system shown in FIG. 3;
FIG. 5 corresponds to the upper right hand portion of FIG. 3, and shows a modification with two intermediate positions; and
FIG. 6 corresponds to the lower left portion of FIG. 1 and shows a modification which controls a circulating fan behind a heat exchanger.

Referring to the drawing, and more particularly to FIG. 1, the control system there shown comprises a sensor 12 responsive to a condition to be regulated and having spaced electrical contacts 14 and 16. There is circuitry including said contacts controlling a time delay relay 20 having contacts 22 and 24. The relay 20 controls a gear-reduction motor 26 for turning a cam shaft indicated in broken lines at 28. There is also corrective apparatus, which in this case has two parts 29 and 30, for controlling the condition to be regulated. A cam 32 on the cam shaft has a drop corresponding to the "on" state of the corrective apparatus. A cam 34 has a drop corresponding to the "off" state of the corrective apparatus. A cam 36 has drops corresponding to an intermediate state of the corrective apparatus. There is also a means, here represented by an arm 38 and a link 40, whereby rotation of the cam shaft and cams controls the corrective apparatus, in this case the part 29. In addition, the cam shaft may include a load cam 42 for operating a switch 43 controlling the corrective apparatus, in this case the part 30. Structurally the switches may be limit switches or precision switches, sometimes called microswitches.

In the example shown the sensor 12 is a thermostat responsive to room temperature. A gas fired furnace is indicated at 46 with a gas supply line at 48. The part 30 is a conventional electrically operated "on" and "off" valve, and the part 29 is a regulating valve adapted to provide an intermediate flow of gas, corresponding to intermediate states of the corrective apparatus.

The relay 20 is preferably a thermal delay relay. It is heated by a heater resistor 50. The circuitry preferably includes an additional ballast resistor 52 which is connected across the sensor contacts 14 and 16. It is short circuited and made inoperative when the "on" cam 32 closes its switch 33, while switch 35 is closed but is operative when the switch 33 is open, at which time switch 35 remains closed. The ballast resistor 52 is connected in series with the heater resistor 50 when it is desired to sharply reduce the heat generated in the relay. The ballast resistor need not be, but preferably is physically located in the thermal relay structure so that the heat dissipated by the ballast resistor 52 is added to that of the heater resistor 50, for electrical efficiency. The ballast resistor is considerably higher, say three (or more) times the value of the heater resistor 50, and, therefore, reduces heating current to one-fourth value. The heat reduction is much more than the increase caused by locating the ballast resistor in the relay, and there is a net reduction, as is desired, so that the relay contacts will open, but only after some delay.

The operation is as follows. On closing of sensor contact 14 (calling for heat), and with cam switch 33 in closed position, a circuit is closed through heater resistor 50 of relay 20. The circuit is from line 1 and conductor 70 through sensor contact 14, cam switch 33 and conductor 56 to resistor 50 and thence back to line 2. After the lapse of a stabilizing time interval, relay contact 22 opens and relay contact 24 closes, causing the motor 26 to operate. The motor circuit is from line 1 through sensor contact 14, cam switch 33, conductor 56, relay contact 24, conductor 58, motor 26, and conductor 60 back to line 2. The motor 26 runs until limit switch 33 opens, thus stopping the cam shaft at a predetermined position. This position is indicated by the cams in the top line of FIG. 2, and is considered to be the full "on" position. The vector at the right is shown at zero degrees.

In this position the cam contact 35 has been closed, and this connects the ballast resistor 52 in series with the heater resistor 50. The circuit is from line 1 through sensor contact 14 and conductor 74 to the ballast resistor 52 to conductor 62, and through cam switch 35 which then is closed, to conductor 64, to heater resistor 50, and thence back to line 2. At this time the motor is still in circuit but the voltage across motor 26 is the same as that across resistor 50, which is reduced to only a small fraction of the operating voltage of the motor, and it does not run.

Because of the greatly reduced current through the heater resistor 50, and after some delay for stabilization, the thermal relay cools enough for contact 24 to open. However, there is still enough heat so that the relay blade floats for a time between the contacts. The ballast resistor 52 and heater resistor 50 are left in circuit as long as the sensor contact 14 does not open. The circuit is the same as previously described, with cam switch 33 open, and cam switch 35 closed, to provide the greatly reduced heating of the relay.

During all this time the load switch 43 at load cam 42 is closed, thereby energizing the solenoid of gas valve 30, and keeping valve 30 open. The circuit for this is from line 1 to the solenoid 31 and thence through line 66 to load contact 43 and thence through conductor 68 back to line 2. It will be understood that solenoid 31 of valve 30 may have its own local relay, so that load switch 43 handles only relay current instead of full solenoid current. However, for simplicity no relay is shown at 31.

The auxiliary gas valve 29 is also wide open. This is so because arm 38 is in upright position, which corresponds to open position of the valve 29.

When the room temperature condition is satisfied to the point of opening the sensor contact 14, a new set of operations takes place. The reduced amount of heat in thermal relay 20 had caused the relay blade to float between the relay contacts 22 and 24. Now the sensor blade 12 is floating between its contacts 14 and 16, thereby opening the previously existing circuit to the ballast resistor 52 and heater resistor 50. All current is cut off from the resistors 50 and 52, which after a lapse of time, cool off, with the result that relay contact 22 closes.

The closing of relay contact 22 closes the power supply circuit of motor 26. The circuit is from line 1 through conductor 70 to switch 37 of intermediate cam 36 to conductor 72, contact 22, and thence through conductor 58 to motor 26. The return is through conductor 60 to line 2. The motor 26 turns the cams to a predetermined first intermediate position, the motor stopping with the opening of the limit switch contact 37. The position of the cams at this time is that indicated in the second line of cams in FIG. 2, which represents the first intermediate position. This is also indicated by the vector at the right of the second line, which vector is at an angle of 60 degrees. It should be noted that cam 36 has two rises 180 degrees apart, one rise serving to stop the motor at a first intermediate position, and the other rise serving to stop the motor at a second intermediate position, as later described.

It should be explained that in simplest form the vector could be at 90 degrees, and there then would be only one intermediate state, half way between "on" and "off." At 90 degrees and at 270 degrees the position arm would be horizontal, and when used as a crank, the same position of valve 29 would result from either. In the present case by positioning the cam at 60 degrees, so that its opposite position is at 240 degrees, there are two intermediate states of the auxiliary valve 29. The first intermediate state, that being used at this time, corresponds roughly to one-third closing (two-thirds opening) of the valve 29. Thus the heating system is reduced from full on to two-thirds on. (This rough estimate ignores the possible effect of angularity in the linkage, etc.).

If the reduced heating is more than needed to maintain room temperature, sensor 12 will move over to the contact 16. If, however, because of extremely cold weather outdoors the reduced heating is insufficient to maintain room temperature, the sensor 12 will move back to contact 14 again. In the first case the heat is shut off entirely, by moving ahead to the "off" position shown by the third line of cams in FIG. 2. In the second case the heat is restored to full on from the two-thirds on position, the cam shaft moving rapidly through the off and one-third on positions back to the full on position.

In the first situation, with sensor contact 16 closed, the circuit is from line 1 through sensor contact 16, to switch 35 of the "off" cam 34, to conductor 64, to relay heater resistor 50, and back to line 2. After a short stabilizing time for the relay to heat up, it closes to contact 24, which causes operation of the cam shaft motor 26. The circuit for this was previously described. The motor turns the cams until the drop in the "off" cam 34 reaches its cam switch 35, which then opens. The position of the cams at this time is illustrated in the third line of cams shown in FIG. 2.

The opening of switch 35 stops the motor 26, and connects the ballast resistor 52 in series with the heater resistor 50. The circuit at this time is from line 1 through sensor contact 16, to conductor 62, to ballast resistor 52, and thence through conductor 74 to the cam switch 33 of the "on" cam, and conductor 56 to heater resistor 50, and then back to line 2. The motor 26 is in shunt with resistor 50, but receives only fractional voltage, and does not operate, as previously described.

After a short lapse of stabilizing time (which could be say a minute but still would be small relative to the time for a change in room temperature to shift the sensor 12), the cooling down of the thermal relay 20 causes its contact 24 to open, and for a time the blade floats between contacts 24 and 22. The motor 26 is then out of circuit, even though the series resistors are still in circuit.

Referring to FIG. 2, in the third or "off" line of cam positions, it will be seen that the switch 43 of the load cam 42 now is open, and this opens the circuit to solenoid 31 (FIG. 1), resulting in shutting of the gas valve 30. Moreover, at this time arm 38 is in its down position, indicated also by the "off" vector in FIG. 2, which corresponds to closed position of the gas valve 29. The furnace then is shut down, and remains so until the room temperature falls enough for the sensor or thermostat contact 16 to open. When two valves are used, it is not necessary for valve 29 to shut off completely. It may be used as a modulating valve, while valve 30 is used for shut off.

When thermostat contact 16 opens, and after a stabilizing time delay at the thermal relay, the furnace is again turned on, but at only an intermediate value, corresponding to the lowest line of cams shown in FIG. 2.

This happens as follows. The opening of sensor contact 16 cuts current from the resistors. After a brief interval the cooling of relay 20 causes closing of contact 22. This energizes motor 26, and turns the cams to the position shown in the lowest line in FIG. 2. The motor is energized by a circuit from line 1, to conductor 70, cam switch 37, conductor 72, relay contact 22, and conductor 58 to motor 26, with a return circuit through conductor 60 back to line 2. When the intermediate position is reached cam 36 opens its switch 37, thereby stopping the motor 26. If the intermediate positions were at 90 and 270 degrees, the auxiliary gas valve 29 again would be half open. However in the present case the intermediate positions are at 60 and 240 degrees, the latter being shown by the vector at the right of the lowest line in FIG. 2, and therefore the auxiliary gas valve 29 now is open only one-third.

Here again the room thermostat may go either way. With very mild outdoor weather it may even move back to again close contact 16, resulting in shutting off the furnace. For this the closing of contact 16 shunts the ballast resistor 52 and puts full voltage on heater resistor 50 through cam switch 35, and after a stabilizing delay, energizes motor 26, all as previously described. The motor then turns the cam shaft through the "on" position, and the first intermediate position, to the "off" position, which is shown by the third line of cams in FIG. 2. The motor operates as long as cam switch 35 is closed, and this remains closed until the "off" position is reached.

If the outdoor weather is more normal, the sensor 12, after opening contact 16 as described previously, moves over to contact 14, which calls for heat. This closes the circuit to heater resistor 50 through cam switch 33, and after a stabilizing delay, energizes motor 26 through relay contact 24, as first described. The cam shaft turns to the "on" position shown by the top line of cams in FIG. 2, at which time the cam switch 33 opens, resistors are open circuited, and the motor stopped.

FIG. 3 shows the invention in a different form in which the corrective state is determined by recurring time intervals rather than by position. Here again there is a sensor 112 having spaced electrical contacts 114 and 116. The circuitry including these contacts controls a time delay relay 120 having contacts 122 and 124. The relay controls a motor 126 for turning a cam shaft 128. The corrective apparatus for controlling the condition to be regulated in this case is an oil burner having a motor 130. It may also be a circulating fan behind a radiator carrying heated or chilled water. Again there are an "on" cam 132, an "off" cam 134, and a third cam 136. This is a cam for providing an intermediate state in the operation of the corrective device 130, but from another viewpoint it may be considered to be a load cam controlling an external load 130. As before, the relay 120 is preferably a thermal relay having a heater resistor 150, and there is an additional ballast resistor 152 connected across the sensor contacts 114, 116.

One difference between FIG. 1 and FIG. 3 is that the contacts of relay 120 are two-pole single-throw, instead of single-pole double-throw. Another is that cam 136 is not a limit switch cam but provides a time period of on and off. The stop points only occur when contacts 114 or 116 are made, and these occur 180 degrees apart at the cams 132 and 134. The motor 126 functions during the period of open circuit of the sensor 112 as a time cycle control of an exterior load through cam 136 operating continuously as long as the open circuit condition remains at sensor 112. As an example, this may provide five minutes on and five minutes off of a heating device, say oil burner 130. Contacts 122 and 124 are normally in closed position during the time cycle operation. Contact 124 is in the circuit of motor 126, allowing the motor 126 to run as long as contact 124 is closed. Contact 122 short circuits the ballast resistor 152 during this period.

It may be explained that in FIG. 1 the motor 26 is a cam shaft motor and/or position-controlling motor. For this purpose the shaft motion may be rapid, providing a full revolution in say a fraction of a minute. However, in FIG. 3 the motor 126 functions primarily as a clock motor, and therefore is provided with extremely high ratio gear reduction, so that the cam shaft functions as a cycle shaft which rotates only once in say ten or fifteen minutes.

When contact 114 of sensor 112 closes, and with the motor 126 in operation, cam 132 closes its switch 133, and this connects resistor 150 in circuit. The heater circuit is from line 1 through sensor contact 114, cam switch 133, resistor 150, relay contact 122, and back to line 2. The motor circuit is from line 1 through conductor 160 to motor 126, and thence through conductor 162 to relay contact 124, and back to line 2. After a lapse of time for stabilization, the relay contacts 122 and 124 open, thereby stopping the motor 126.

At the same time the load cam 136 is in the position in which its switch is closed and the load is on. This is shown in the upper line of cams in FIG. 4. The opening of relay contact 124 ends the short circuiting of the ballast resistor 152, thereby connecting it in series with the heater resistor 150. This cuts down the heater current to a fraction of previous value, as previously described for FIG. 1.

When the room temperature (or more broadly the condition controlled) changes enough to open the contact 114, but without yet closing the contact 116, and after a lapse of time for stabilization, the motor 126 is again put in operation. What happens is that the resistors are open circuited and cool off. The relay contacts 122 and 124 close. The closing of contact 124 energizes the cam shaft motor 126. The closing of contact 122 short circuits the ballast resistor 152, preparatory for future operation in the event that heat is called for, but the resistors are not at this time heated at all because contacts 114, 116 are open.

The cam shaft motor 126 rotates continuously to cause a cycled operation of the oil burner, say five minutes on and five minutes off, which represents an intermediate operation of the furnace. This intermediate operation continues until the room temperature drifts enough to cause closing of either the thermostat contact 114 which calls for more heat, or closing of contact 116 which calls for shut down. The closing of contact 114 causes full time operation of the oil burner, instead of the cycled or intermittent operation previously existing. This happens as follows.

The rotating cam shaft, on reaching a position corresponding to the upper line in FIG. 4, closes cam switch 133 of cam 132, and current then flows from line 1 through contact 114, cam switch 133, to resistor 150 which, after a stabilizing lapse of time, opens the relay contacts 122 and 124, the latter of which de-energizes motor 126. The response of the delay relay 120 is faster than the cam movement.

With the cams stopped in the position of the upper line of cams in FIG. 4, the load switch 137 is closed, and there is continuous operation of the oil burner motor 130, and this continues until contacts 114 open. At that time the cycled or intermittent operation previously described is resumed.

If, however, the previously existing cycled operation leads to elevated room temperature, as for example because of mild outdoor weather, the thermostat 112 closes to the contact 116, and this results in shutting off the furnace completely. This is accomplished as follows. During the rotation of the cam shaft, and when the "off" cam 134 closes its switch 135, the situation is that indicated by the lower line of cams in FIG. 4. A circuit then flows from line 1 (FIG. 3) through sensor contact 116 and cam switch 135 to heater resistor 150, and then through contact 122 of relay 120 and back to line 2. After a brief stabilizing delay, the relay contacts 122 and 124 open, and the opening of the latter stops the cam shaft motor 126, the cams then remaining in the "off" position shown by the lower line of cams in FIG. 4. At this time the load switch 137 is open, and the oil burner motor 130 is stopped. It remains stopped until the room temperature falls enough for the contacts 116 to open. At that time the drive of cam shaft motor 126 resumes, with consequent cycled or intermittent operation of the oil burner.

The motor 130 may have a local relay, not shown, in which case load switch 137 will carry only a small relay current, instead of the full motor current.

In FIG. 3 there is a single intermediate state, with the oil burner or circulating fan operating half the time and stopped half the time. It is readily possible to provide several intermediate states, and this is illustrated in FIG. 5, which corresponds to the upper right hand portion of FIG. 3. Instead of a single load cam 136, as in FIG. 3, there are two load cams 202 and 204. The cam 204 closes its switch for one-third the time and permits it to open for two-thirds of the time, thereby affording what may be termed a low operating rate, but cam 202 closes its switch for two-thirds of the time and permits it to open for one-third of the time, thereby providing what may be termed a high operating rate. A switch 206 makes either load cam operative.

This switch 206 may be manually operated, it being moved to the left in cold weather, and to the right in moderate weather, assuming the corrective device 130 to be an oil burner. In more elegant form the switch 206 may itself be a sensor, and more specifically a thermostat mounted on the outside of the building. It may be so adjusted that with an outdoor temperature below some suitable value, say thirty-two degrees, the high rate intermediate cam 202 is employed, whereas for an outdoor temperature above 32 degrees, the low rate intermediate cam 204 is employed.

It will be understood that a third intermediate cam could be provided between the cams 202 and 204, and operating for say 180 degrees, as shown by the cam 136 in FIG. 3. The switch 206 then would be a three-position switch for selection of any one of the three cams, providing for time intervals of one-third on, one-half on, or two-thirds on, as desired. Conversely, even with only one cam, as in FIG. 3, the cam may be designed for say one-third on, or two-thirds on, instead of one-half on, for the single intermediate time cycle.

Figure 6:
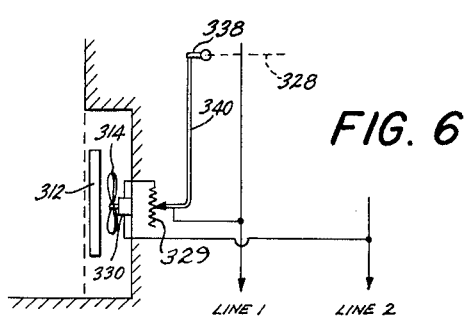

It was previously mentioned that the "position control" of FIG. 1 may be used in other ways, and one such variant is indicated in FIG. 6. In this case a heat exchanger or radiator 312 may be recessed in a wall and may receive heated water in winter and chilled water in summer. The thermostat is a room thermostat, and it controls the operation of a circulating fan 314 disposed behind the radiator 312. The fan is driven by an electric motor 330, the speed of which is varied by a rheostat 329, and this is done by means of a link 340 connected to an arm 338 on cam shaft 328. On comparison with FIG. 1, it will be seen that FIG. 6 corresponds to the left end of FIG. 1, with the parts 328, 338 and 340 corresponding to the parts 28, 38 and 40 in FIG. 1.

When the thermostat calls for heat, the arm 338 is in up position, and the fan operates at full speed. When the opposite thermostat contact is closed the arm 339 is in down position, and the fan is stopped. With a single intermediate position, say at 90 degrees, as shown in FIG. 6, the fan operates at half speed. However, as in FIG. 1, other intermediate positions may be used, say 60 degrees on the way down, and 240 degrees on the way up.

In the arrangement of FIG. 6 there is no need for a load cam and load switch such as the parts 42 and 43 shown in FIG. 1. However, those parts may be employed if desired, and in such case would control the power supply circuit to the fan, for complete on and off, with the arm 338 then controlling the effective insertion or removal of the speed-reducing resistor.

Moreover, the arm 338 may be omitted and the load cam alone used, but shaped or stepped to provide several different switch positions for several different fan speeds.

Also, as previously mentioned, the cycle arrangement of FIG. 3 or FIG. 5 may be used to control the fan motor 330. In such case the fan operates at only one speed, and for the intermediate state it is cycled on and off by the clock motor.

In all cases the delayed action is obtained for stabilization. It prevents unnecessary operations of the control system caused by possible internal chattering or externally applied vibration at the sensor contacts.

It is believed that the construction and operation of my improved control mechanism, as well as the advantages thereof, will be apparent from the foregoing detailed description. It will also be apparent that while I have shown and described the invention in several preferred forms, changes may be made without departing from the scope of the invention as sought to be defined in the following claims.

I claim:

1. A control system comprising a sensor responsive to a condition to be regulated and having a contact movable between spaced electrical contacts, circuitry including said contacts controlling a time delay relay, said relay controlling a cam shaft motor for turning a cam shaft, corrective apparatus for controlling the condition to be regulated, control cams on said shaft corresponding to "on" and "off" and one or more intermediate states of the corrective apparatus, a load cam on said cam shaft for operating a load switch for controllong the corrective apparatus, and means including control switches controlled by said control cams and connected in the aforesaid circuitry of the relay whereby rotation of the cam shaft and cams controls the corrective apparatus.

2. A control system as defined in claim 1 in which the state of the corrective apparatus depends on the angular position of the cam shaft, and in which at least a part of the corrective apparatus is mechanically related to the cam shaft.

3. A control system as defined in claim 1 in which the motor which turns the cam shaft operates as a clock motor providing rotation of the cam shaft, and in which the load cam is so proportioned as to provide desired predetermined intervals of "on" and "off" state of the corrective apparatus as an intermediate state.

4. A control system comprising a sensor responsive to a condition to be regulated and having a contact movable between spaced electrical contacts, circuitry including said contacts controlling a thermal delay relay, said relay controlling a cam shaft motor for turning a cam shaft, corrective apparatus for controlling the condition to be regulated, controls cams on said shaft corresponding to "on" and "off" and one or more intermediate states of the corrective apparatus, a load cam on said cam shaft for operating a load switch for controlling the corrective apparatus, and means including control switches controlled by said control cams and connected in the aforesaid circuitry of the relay whereby rotation of the cam shaft and cams controls the corrective apparatus.

5. A control system as defined in claim 4 in which the thermal delay relay has a heater resistor, and in which there is an additional ballast resistor, and in which the ballast resistor is connected in series with the heater resistor when the relay has operated until the sensor subsequently opens between its spaced contacts.

6. A control system as defined in claim 4 in which the thermal delay relay has a heater resistor, and in which there is an additional ballast resistor, and in which the ballast resistor is physically located in the thermal relay so that heat dissipated by the ballast resistor is added to that of the heater resistor, and in which the ballast resistor is connected in series with the heater resistor when the relay has operated until the sensor subsequently opens between its spaced contacts.

7. The combination in a regulator of a sensor with spaced "on" and "off" contacts and a movable element providing an open circuit between the "on" and "off" contacts, switch-operating cams on a cam shaft driven by a cam shaft motor, a time delay relay operated by the sensor to control the cam shaft motor, said relay functioning to introduce delay in each case on the make or break of the "on" and "off" contacts of the sensor in order to allow the condition being regulated to become stabilized before operation of the cam shaft motor by any one of the make of the "on" contact, the break of the "on" contact, the make of the "off" contact, and the break of the "off" contact, a load cam on said cam shaft for operating a load switch for controlling a corrective apparatus, and means whereby rotation of the cam shaft and cams controls the corrective apparatus.

8. The combination in a regulator of a sensor with spaced "on" and "off" contacts and a movable element providing an open circuit between the "on" and "off" contacts, switch-operating cams on a cam shaft driven by a cam shaft motor, a time delay relay operated by the sensor to control the cam shaft motor, said relay functioning to introduce delay in each case on the make or break of the "on" and "off" contacts of the sensor in order to allow the condition being regulated to become stabilized before operation of the controlled motor by any one of the make of the "on" contact, the break of the "on" contact, the make of the "off" contact, and the break of the "off" contact, said cam operated switches causing rotation of the shaft by said cam shaft motor to one predetermined position on make of "on" contact, to a second predetermined position on the break of "on" contact, to a third predetermined position on the make of "off" contact, and to a fourth predetermined position on the break of "off" contact, a load cam on said cam shaft for operating a load switch for controlling a corrective apparatus, and means whereby rotation of the cam shaft and cams controls the corrective apparatus.

9. The combination in a regulator of a sensor with spaced "on" and "off" contacts and a movable element providing an open circuit between the "on" and "off" contacts, suitable switch operating cams on a cam shaft driven by a cam shaft motor, a time delay relay operated by the sensor to control the cam shaft motor, said relay functioning in each case on the closing of the "on" and "off" contacts of the sensor to allow the condition being regulated to become stabilized before causing operation of the controlled cam shaft motor, said cam operated switches controlling the rotation of the cam shaft by the cam shaft motor, an external power driven corrective device having extreme and intermediate corrective states, a load switch, and a load cam on said cam shaft operating said load switch for controlling said corrective device, said load cam being so shaped as to provide an intermediate corrective state between the extreme corrective states.

10. The combination in a regulator of a sensor with spaced "on" and "off" contacts and a movable element providing an open circuit between the "on" and "off" contacts, suitable switch operating cams on a cam shaft driven by a cam shaft motor, a time delay relay operated by the sensor to control the cam shaft motor, said relay functioning in each case on the closing of the "on" and "off" contacts of the sensor to allow the condition being regulated to become stabilized before causing operation of the controlled cam shaft motor, an external power driven corrective device, a load switch and a load cam on said cam shaft operating said load switch for controlling said power driven corrective device, said cam operated switches controlling the rotation of the cam shaft by the cam shaft motor to one predetermined position on the make of the "on" contact of the sensor to close the load switch to start and maintain the operation of the external corrective device during the period of the "on" contact, then on the opening of the "on" contact of the sensor to start and maintain the operation of the cam shaft motor on a time cycle system and to cause operation of the external corrective device with a period of "on" operation and a period of "off" operation of said external load which periods depend on the shape of the load cam, and to another predetermined position on the make of the "off" contact of the sensor and to shut down the operation of the external corrective device during the period of the "off" contact, and then on the opening of the "off" contact of the sensor to start and maintain the operation of the cam shaft motor on a time cycle system with means to further maintain the operation of an external corrective device with a period of "on" operation and a period of "off" of said external load which periods depend on the shape of the load cam.

11. A control system comprising a sensor responsive to a condition to be regulated and having a contact which is movable between spaced electrical contacts, circuitry including said contacts for controlling a thermal delay relay, said relay then controlling a cam shaft motor for turning a cam shaft, corrective apparatus for controlling the condition to be regulated, control cams on said cam shaft corresponding to "on" and "off" states of the corrective apparatus, a load cam on said cam shaft for operating a load switch for controlling the corrective apparatus, and means including control switches controlled by said control cams and connected in the aforesaid circuitry of the relay whereby rotation of the cam shaft and cams controls the corrective apparatus, said thermal delay relay having a heater resistor, and an additional ballast resistor, said ballast resistor having a high resistance compared to the heater resistor, and being physically located in the thermal relay so that heat dissipated by the ballast resistor is added to that of the heater resistor, and said ballast resistor being connected in series with the heater resistor when the relay has operated until the sensor subsequently opens between its spaced contacts.

References Cited by the Examiner
UNITED STATES PATENTS

| | | | |
|---|---|---|---|
| 1,673,057 | 6/1928 | Sweatt | 236—78 X |
| 2,216,597 | 10/1940 | Minneci | 200—38.1 |
| 2,218,454 | 10/1940 | Midyette | 236—74 |
| 2,325,707 | 8/1943 | Preston | 236—76 |
| 2,468,830 | 5/1949 | Markham | 236—1 |
| 2,998,920 | 9/1961 | Brown | 236—46 X |

WILLIAM F. O'DEA, *Acting Primary Examiner.*

ALDEN D. STEWART, *Examiner.*